(12) United States Patent
Filip

(10) Patent No.: US 8,229,589 B2
(45) Date of Patent: Jul. 24, 2012

(54) METHOD AND APPARATUS FOR FABRICATING A FOAM CONTAINER WITH A COMPUTER CONTROLLED LASER CUTTING DEVICE

(75) Inventor: Romeo Filip, Gilbert, AZ (US)

(73) Assignee: Battle Foam, LLC, Gilbert, AZ (US)

( * ) Notice: Subject to any disclaimer, the term of this patent is extended or adjusted under 35 U.S.C. 154(b) by 142 days.

(21) Appl. No.: 12/479,410

(22) Filed: Jun. 5, 2009

(65) Prior Publication Data

US 2010/0260999 A1    Oct. 14, 2010

Related U.S. Application Data

(60) Provisional application No. 61/168,783, filed on Apr. 13, 2009.

(51) Int. Cl.
| | | |
|---|---|---|
| G06F 19/00 | (2006.01) |
| B32B 1/00 | (2006.01) |
| B32B 3/00 | (2006.01) |
| B23K 26/00 | (2006.01) |
| B23K 26/02 | (2006.01) |
| B23K 26/06 | (2006.01) |
| B23K 26/08 | (2006.01) |

(52) U.S. Cl. ............... 700/166; 219/121.6; 219/121.63; 219/121.65; 219/121.67; 219/121.72; 219/121.74; 428/187

(58) Field of Classification Search .......................... None
See application file for complete search history.

(56) References Cited

U.S. PATENT DOCUMENTS

| | | | |
|---|---|---|---|
| 4,952,770 A * | 8/1990 | Hayashi | 219/121.67 |
| 5,197,013 A * | 3/1993 | Dundorf | 700/182 |
| 5,262,612 A * | 11/1993 | Momany et al. | 219/121.67 |
| 5,688,538 A | 11/1997 | Barr et al. | |
| 5,854,460 A | 12/1998 | Graf et al. | |
| 5,992,633 A | 11/1999 | Burchard | |
| 6,125,733 A | 10/2000 | Hwang | |
| 6,294,124 B1 | 9/2001 | Bauer et al. | |

(Continued)

FOREIGN PATENT DOCUMENTS

DE    1779775 A1    9/1971

(Continued)

OTHER PUBLICATIONS

Universal Laser Systems, Inc., M-300 Laser Engraving and Cutting System Safety, Installation, Operation, and Basic Maintenance Manual, Section 3: Focusing Methods, pp. 22-23, Apr. 2002, Scottsdale, AZ, USA.

(Continued)

*Primary Examiner* — Sean Shechtman
*Assistant Examiner* — Sunray Chang
(74) *Attorney, Agent, or Firm* — Daniels Patent Law PLLC; Scott A. Daniels

(57) ABSTRACT

A method and apparatus for fabricating a foam container by using a laser cutting apparatus to precisely cut and remove portions of foam in order to form custom and predetermined text, indentations and protective compartments in the foam, and more particularly a method of controlling the laser relative to high density foam to create precise cuts completely through the foam without subsequently adjusting the focal point of the laser, the cuts being made according to exterior dimensions of an object to be supported and protected in the high density foam.

8 Claims, 13 Drawing Sheets

U.S. PATENT DOCUMENTS

| | | | |
|---|---|---|---|
| 6,313,433 | B1 | 11/2001 | Sukman et al. |
| 6,386,083 | B1 | 5/2002 | Hwang |
| 6,423,925 | B1 | 7/2002 | Sukhman et al. |
| 6,455,807 | B1 * | 9/2002 | Scott ........................ 219/121.72 |
| 6,477,931 | B1 | 11/2002 | Denney |
| 6,513,414 | B1 | 2/2003 | Denney et al. |
| 6,546,836 | B1 | 4/2003 | Denney et al. |
| 6,832,538 | B1 | 12/2004 | Hwang |
| 6,868,765 | B2 | 3/2005 | Poetzsch |
| 7,060,934 | B2 | 6/2006 | Risser et al. |
| 7,076,857 | B2 | 7/2006 | Yang |
| 7,102,118 | B2 * | 9/2006 | Acker et al. .................. 250/216 |
| 2002/0114537 | A1 * | 8/2002 | Sutula, Jr. ..................... 382/285 |
| 2004/0128932 | A1 * | 7/2004 | Estape ....................... 52/506.01 |
| 2006/0196858 | A1 * | 9/2006 | Barron et al. ............. 219/121.69 |
| 2010/0040836 | A1 * | 2/2010 | Li et al. .......................... 428/187 |
| 2010/0140238 | A1 * | 6/2010 | Mozley et al. ............ 219/121.72 |

FOREIGN PATENT DOCUMENTS

| | | |
|---|---|---|
| EP | 0711627 A2 | 5/1996 |
| EP | 1240972 A1 | 9/2002 |

OTHER PUBLICATIONS

PCT International Application No. PCT/US10/30479 International Search Report, Publication No. WO2010/120638 Published Oct. 21, 2010.

PCT International Application No. PCT/US10/30479 Written Opinion, Publication No. WO2010/120638 Published Oct. 21, 2010.

* cited by examiner

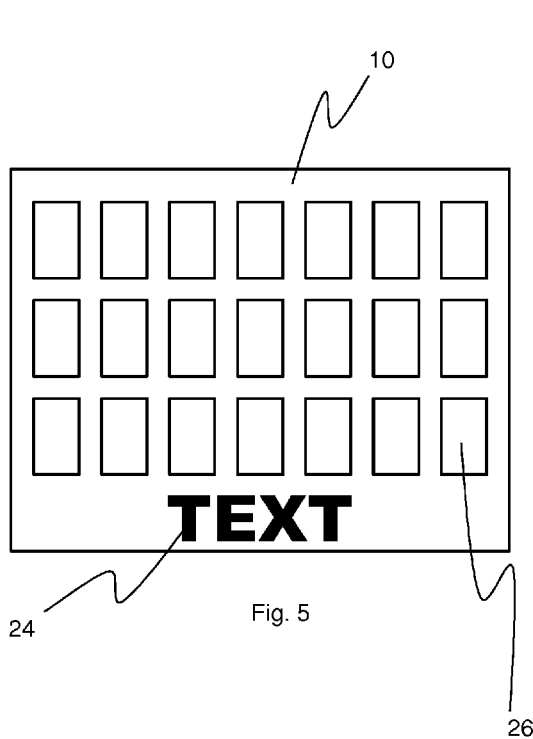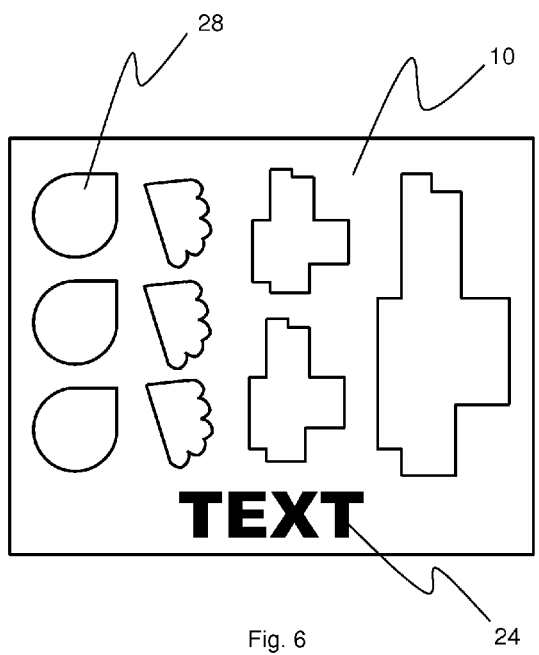

METHOD AND APPARATUS FOR FABRICATING A FOAM CONTAINER WITH A COMPUTER CONTROLLED LASER CUTTING DEVICE

FIELD OF THE INVENTION

The present invention relates to a method and apparatus for fabricating a foam container by using a laser cutting apparatus to precisely cut and remove portions of foam in order to form custom and predetermined text, indentations and protective compartments in the foam, and more particularly a method of controlling the laser relative to high density foam to create precise cuts completely through the foam without subsequently adjusting the focal point of the laser, the cuts being made according to exterior dimensions of an object to be supported and protected in the high density foam.

BACKGROUND OF THE INVENTION

The fabrication of foam containers with compartmental cutouts is well known. Methods using machinery that have movable working benches to position and move the foam along a cutting blade that may be positioned on a vertical or horizontal axis in relation to the table have been widely used and are described in U.S. Pat. Nos. 6,386,083, 6,125,733 and 6,832,538. Each of the apparatus described present limitations in positioning the foam in relation to the cutting blade. Notably, these conventional cutting apparatus are limited by the type and size of the cutting blade and do not allow internal transverse cuts into the foam to create three dimensional compartments. Other methods as described in U.S. Pat. No. 5,688,538 and in U.S. Pat. No. 6,477,931 use sets of rollers with patterned dies that are pressed against a foam sheet with sufficient force to extrude portions from the foam. The extruded portions are then removed and patterned indentations are formed in the foam sheet. The use of die cut presses at high temperatures as shown in U.S. Pat. No. 7,076,857 stamp patterns into foam sheets to form indentations. Rollers or die cutters have the limitation of high costs to create the molds for each unique pattern indentation thus limiting the ability to create custom designed compartments that would fit oddly shaped objects.

Another method as described in U.S. Pat. No. 5,992,633 pulls electrically heated wires through blocks of foam to form loose fill packaging material to provide for no disassembly of the block foam until the fill material is needed. This method also presents the limitation of positioning the foam along the electrically heated wires and allows for only straight cuts through the foam not transverse cuts to form indentations and compartments. A number of limitations of creating indentations in foam are overcome in U.S. Pat. No. 6,868,765 that uses pulleys and drive arms to position a cutting element carrier to allow rotational movement of a cutting element using a blade knife or cutting wire to cut various shapes and contours within a foam material.

In order to address the limitations of positioning the foam piece to the cutting apparatus and to provide for custom three dimensional compartment designs the present invention uses a laser material processing system to create cuts and indentations within high density foams. A laser material processing system includes a laser source, a power supply, a CPU for receiving a computer program to control beam positioning and corresponding laser modulation, a control panel and a beam delivery system. Patterns are cut from materials using a vector motion of the laser beam by moving a beam delivery system simultaneously along X and Y axes in accordance with the path of the desired pattern while applying a controlled amount of laser energy to cut into or through the material.

As is known in the prior art, the output laser beam is directed along paths parallel to the Y-axis and the X-axis respectively using mirrors and/or other known optical elements. A final mirror and a final focusing lens are located in the beam focusing assembly of the system, such that the final mirror directs the beam out of the plane of the X-Y motion system to the final focusing lens. The final focusing lens then focuses the resulting beam to a focus spot on the subject material workpiece in order to engrave along the surface or cut into the material. Adjustments to the position of the mirror or choosing different types of lens or other optical elements will adjust the focal point of the laser and spot size thus adjust the power output of the laser. These adjustments allow the use of a laser system to cut and engrave plastic, wood, rubber, and rubber-like material, and paper. What has not been accomplished in the prior art is a method of successfully cutting high density foam using a laser material processing system. High density foam is a petroleum based product and particularly flammable. When used with high energy lasers the material is highly susceptible to overheating and catching fire. Any smoke and debris from such overheating or fire will damage the laser system as well as at the very least coat the lens and mirrors of the focusing assembly system causing cracking and destruction of these elements.

SUMMARY OF THE INVENTION

The present invention is directed to a method of using laser cutting tools to form predetermined and custom designed text, indentations and protective compartments in a range of high density foams, thereby permitting the foam to securely hold and protect another object fit into the indentation or compartment. The method includes the use of a laser material processing system into which graphical designs and texts can be entered into a computer system and saved as templates.

The graphical designs may be captured initially manually where an object to be supported and secured in the foam has a specific weight and shape, and is placed on a drawing sheet and traced to create an outline. The outline could also be traced and/or estimated by a other mechanical or software means, but in whichever manner this is accomplished an outline will capture an irregular shape of any object which needs to be securely placed in such high density foam for protection. An example of such objects which require a soft protective foam compartment are war gaming models where the small models themselves have many intricate parts, limbs and extensions which can be easily broken if not adequately protected. These models require a soft, but tightly toleranced foam compartment to prevent the limbs and extensions from being broken off. It is to be appreciated that the method and apparatus of the present invention could be used to also cut foam for protection of other objects and sensitive items as well, such as firearms, medical and scientific testing and measurement equipment, etc.

Once the dimensions of the object are rendered or estimated into an outline drawing, the outline drawing is then uploaded to a computer program by using a scanner, a digital camera, or some other device to capture the design. The computer program converts the design into a template of X-Y coordinates for a laser material processing system. These coordinates are used to directly control the movement of the laser to cut a design shape within a material that specifically matches the uploaded outline drawing. Multiple outline drawings could be grouped to form a single design template of X-Y coordinates for the laser material processing system.

The design template and size and weight of the object will be used to determine a suitable high density foam material that will adequately protect and support the object. The method is then directed to optimization of the focal point and power of the laser and to adjustments of speed of the laser in moving through the X-Y axes to cut into the material without overheating and damaging the material, laser focusing system assembly or other equipment. As described below further optimization of the focal point, power and speed must consider the thickness and density of the material, and the specific customizations required in the design template as to whether an indentation of a specific graphical design is created in the material or the material is cut completely through and backing is used to support the object within the foam compartment.

Custom design graphical indentations and text created from a design template are done by adjusting the focal point of the laser to the surface edge of the material or to a minimal depth within the material. The laser is then driven through a serious of movements in the X-direction from the first edge of the design to the furthest edge of the design and then moved in the Y-direction and then back in the X-direction to sufficiently move the laser back and forth over the design area and burn out or etch the design into the foam material. As will be described further because of the softness of the material the adjustment of speed and power are reduced to prevent overheating of the material.

In cutting through the foam material the laser focal point is adjusted to a position that focuses the laser to a depth that is beyond the thickness of the material. An appropriate lens depending upon the thickness of the material is selected and the outer edge of the beam focusing assembly of the system (the exit point of the laser from the system) is positioned directly on top of the upper surface of the foam material, thereby adjusting the final focusing lens to a focal point that is beyond the top surface of the subject material workpiece and the focal point being somewhere inside the depth of the material generally closer to a bottom surface of the workpiece rather than the top surface. Adjustments to speed and power allow the laser beam to cut through the foam material even though the focal point of the laser is not on or even close to the top surface of the foam material being cut.

In cutting the protective compartments from the custom designed template completely out of the foam material an appropriate enclosure must be formed with a specific profile to hold the selected objects. The present invention uses a high density foam backing of a thickness dependent upon the size and weight of the selected objects. This foam backing is adhered to the cutout foam material using a hot roller glue system that coats adhesive to each irregular surface of the cutout foam material and securely adheres the foam backing to the foam material further protecting the selected objects within the protective compartments.

These and other features, advantages and improvements according to this invention will be better understood by reference to the following detailed description and accompanying drawings.

BRIEF DESCRIPTION OF THE DRAWINGS

FIG. 5 is a diagrammatic view of a section of foam material with standard rectangular portions removed using the present invention;

FIG. 6 is a diagrammatic view of a section of foam material with irregular shaped portions removed using the present invention;

FIG. 12($b$) is a modified tracing for input to a computer controlled cutting device.

DETAILED DESCRIPTION OF THE INVENTION

Figure 1:
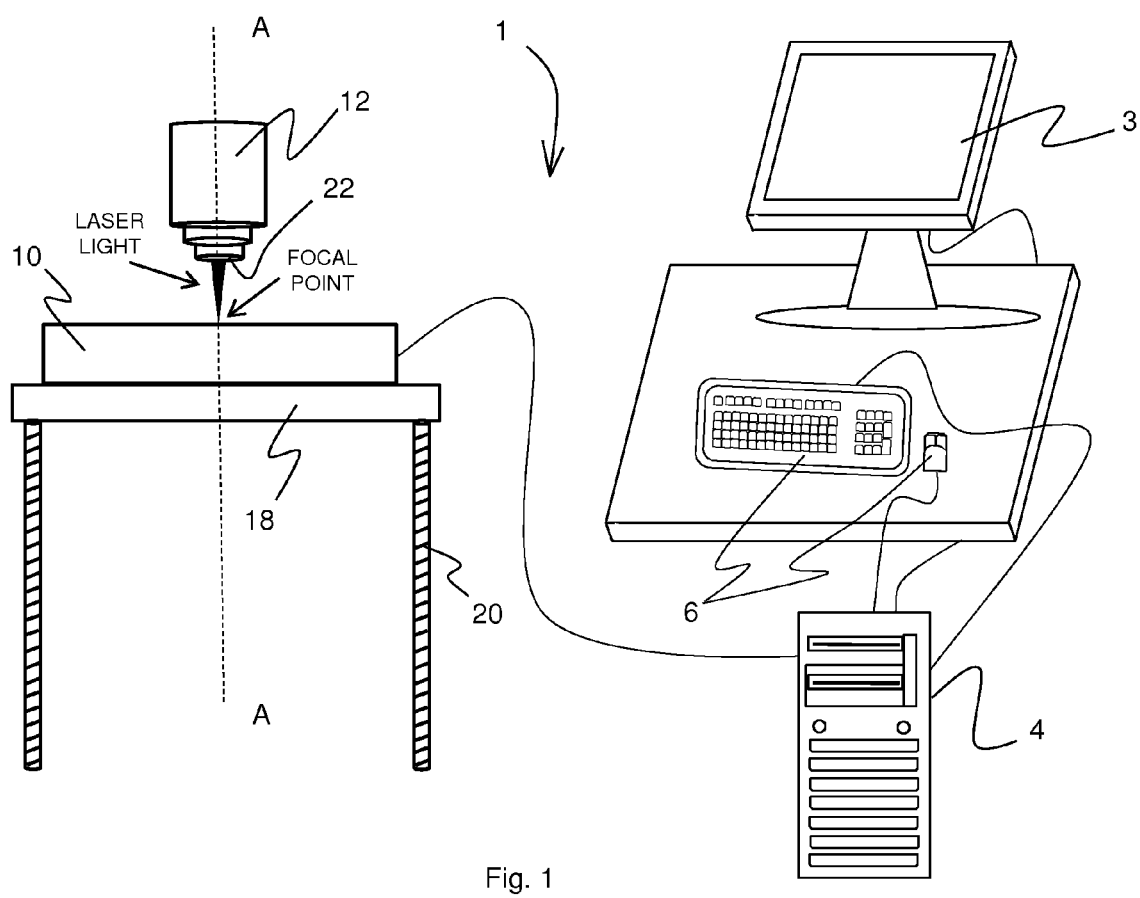
FIG. 1 is a perspective view of the laser material processing system.
Figure 1A:
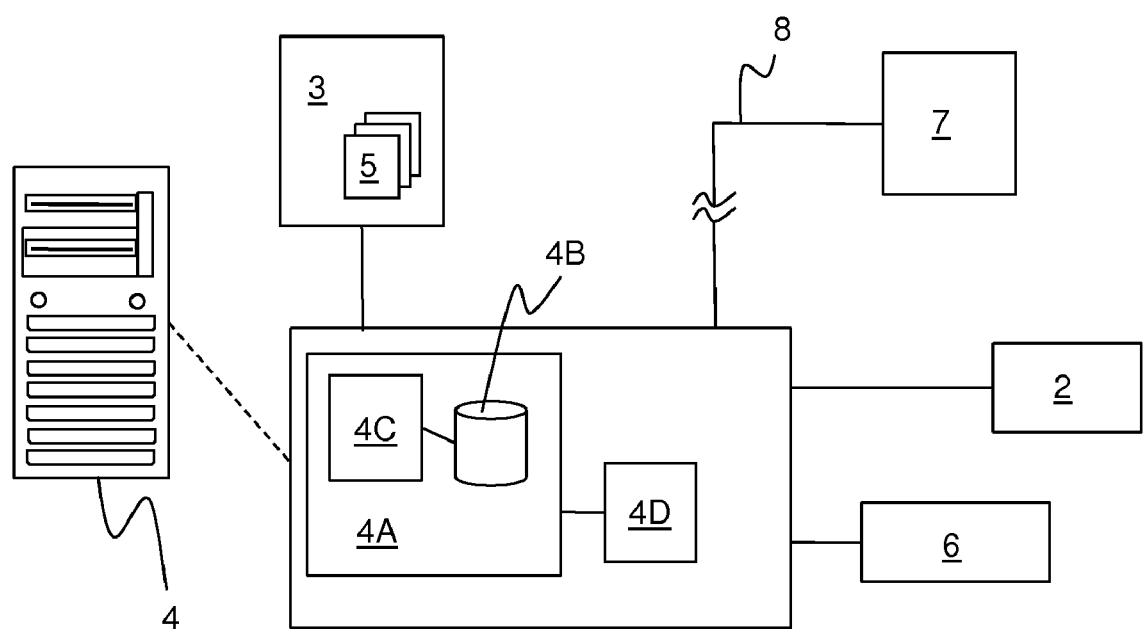
FIG. 1A is diagrammatic representation of the computer system and control electronic memory unit.

As described briefly above, the present invention is directed to an apparatus and method of fabricating foam containers or packaging with custom text, indentations and specifically profiled protective compartments using a computer system and software controlled laser cutting device for transferring a predetermined template through the computer system and via the laser cutting device cutting a foam material to replicate the predetermined template. As shown in FIGS. 1 and 1A, the exemplary computer and software controlled laser material processing system 1 includes, for example, an image capture device 2 such as a digital camera or a digital scanner which can input an image of a template or design to be stored in the computer memory of the computer system. The system 1 includes a display screen 3, an electronics and memory unit 4 connected to display screen 3 for storing and displaying one or more template images 5 through display screen 3, and a local control input 6 connected to electronic and memory unit 4 for direct user control of the system 1. The computer and software controlled laser material processing system 1 may further include an internet connection and even a wireless modem 8 connected to electronics and memory unit 4 for receiving and downloading template images 5 from a remote node 7, such as a connection to a service provider or remote customer. Other elements of the computer system and software controlled laser material processing system 1, such as various forms of power supply and various implementations thereof, will be understood by those of ordinary skill in the relevant arts to be included in the material processing system 1 without further description thereof as such elements are well known in the art.

Referring to FIG. 1A, electronics and memory unit 4 typically includes a memory 4A for storing one or more images 5 received from, for example, the image capture device 2 and/or remote node 7 through internet or wireless modem 8. Also in memory unit 4A is a system control mechanism 4B typically comprised of program modules for controlling the general operation of the material processing system 1, and an image display control mechanism 4C, typically comprised of program modules, for controlling the selection and display of images 5 as described below. System and image display control mechanisms 4B and 4C control a processor unit 4D that in turn controls the operations of memory 4A, display screen 3, image capture device 2 and such of local control input 6 and internet and wireless modem connection 8 as may be implemented in the system 1.

The structure, functions and operation of a system control mechanism 4B controlling processor unit 4D, memory 4A, display screen 3, local control input 6, internet and wireless modem connection 8, are well known and understood by those of ordinary skill in the art and, as such, need not be described further herein. The following description will therefore focus on the structure, functions and operations of the computer system and software controlled laser material processing system 1.

Figure 2:
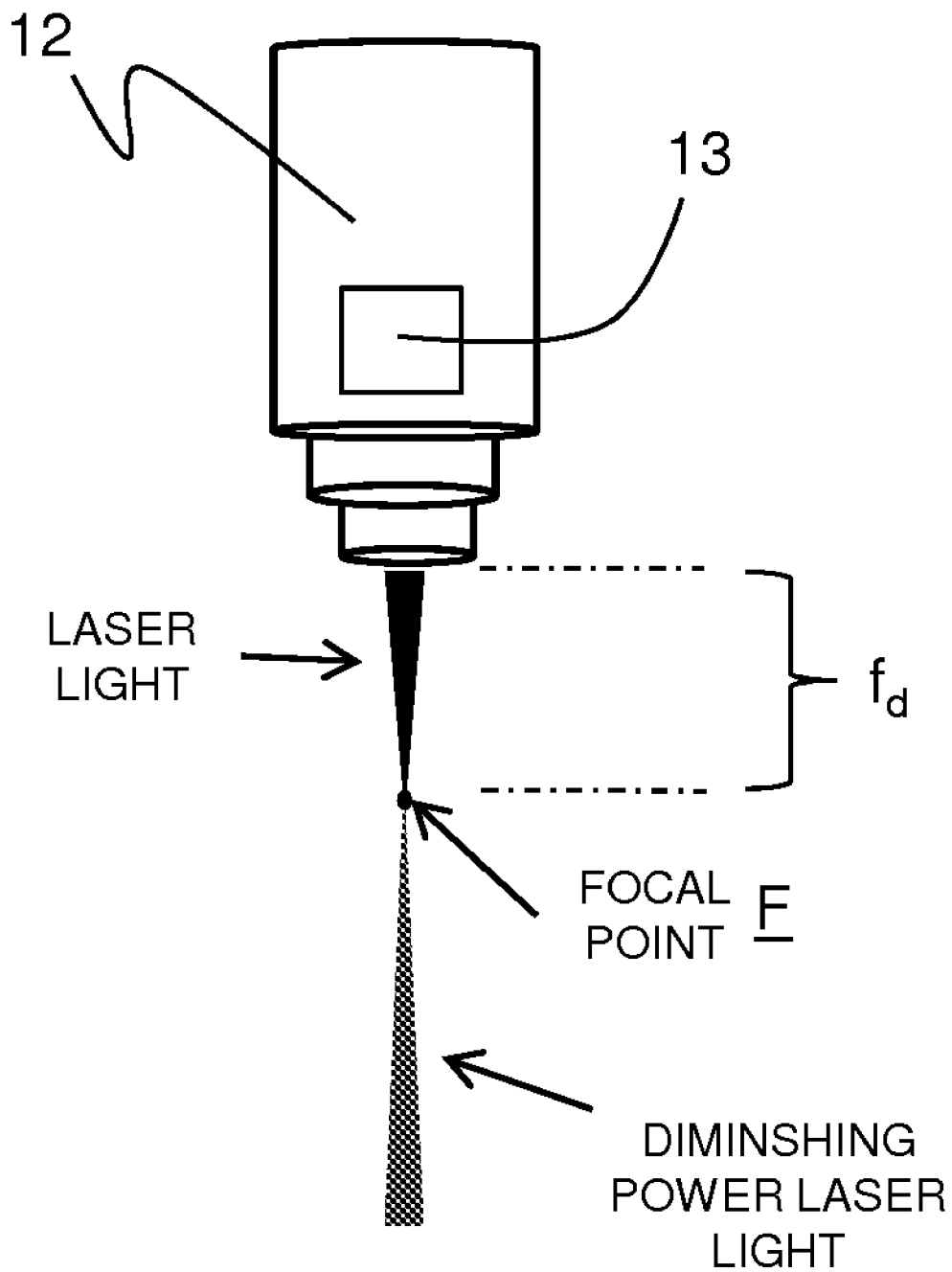
FIG. 2 is an enlarged view of the laser showing the focal point of the laser light beam.
Figure 3:
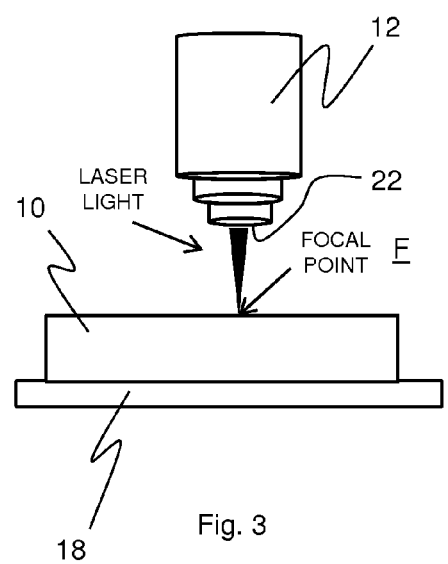
FIG. 3 is a perspective view of the focal point of the laser light beam on the surface edge of the foam material.

FIG. 1 also shows a representation of the laser material processing system 1 with the beam focusing assembly 12 of the laser shown aligned above and directed along a cutting axis A at a section of foam material 10. The foam material 10 is supported on a bottom surface by the a support bench 18 with a front surface of the foam material 10 facing the focusing assembly. The support bench 18 is mounted on adjustable legs 20 or a similar linear adjustment mechanism which allows movement of the support bench 18 linearly along the axis A, where the axis A perpendicularly intersects the planar surface 19 of the support bench 18. The linear adjustment of the support bench along the axis A positions the foam material 10 closer or farther from the beam focusing assembly 12 and in this manner consequently adjusting the focal point F of the laser relative to the foam material 10 and the support bench 18 as seen in FIG. 2.

The beam focusing assembly 12 has mirrors 13 and other optical elements that predetermine the focal point F of the culminated beam of laser light at a specific beam focal length $f_d$. This specific beam focal length $f_d$ (which therefore defines the focal point F) is the distance from the exit point of the laser 22 at the edge surface of the beam focusing assembly 12 to the predetermined length based upon the selected mirror 13 used for beam focusing in the beam focusing assembly 12. These preset distances have a range of focal point lengths from 1.5" to 7.0" with each designated beam focal length $f_d$ being associated with a specific mirror. With the support bench 18 at its maximum height and the use of a focal point spacer (not shown) that has a specific length complementing the beam focal length $f_d$ of each mirror the beam focusing assembly 12 can be adjusted to position the focal point F directly at a point on the surface of the foam material 10.

As discussed below, the focal point F of the laser is set according to the strength of the mirrors 13 used with the beam focusing assembly 12. Generally, a 1.5 mirror focuses the beam at a focal point F of 1.5 inches from the front of the laser 22, similarly a 4 mirror focuses the beam at a focal point F of 4 inches from the mirror. The focal point F is the point at which the beam focuses all its energy so as to provide the most cutting power at this focal point F. What is critical to understand with respect to the present invention and unconventional within the art is the relative alignment of the foam material 10 to be cut or machined relative to the focal point F where the focal point F of the beam is focused deep within the foam material to be cut or machined rather than on the surface of the material. The words "cut" and "machined" are used either together or separately to indicate generally the removal of material from the foam material 10 by the laser beam assembly 12.

This method and system is particularly unconventional because the strength of the beam along the focal length $f_d$ is not strong enough at a set power level to cut most materials except at the focal point F, without changing the relative positioning between the material being cut and the focal point F. In other words, in conventional use because the focal point is the cutting point of the material, the focal point must be moved relative to, i.e. through the material, along the axis A to cut all the way through the material. Thus, where the material to be cut or machined and the focal point F are maintained at the same distance relative to one another, in almost any material this would fail to cut or machine the material at all, since the beam would not get through the material to cut the material unless the focal point F is directly on the surface of the material being cut or machined. Alternatively, the focal point F of the beam would have to be maintained at a single location for an undesirable amount of time, and then moved along the axis A from the surface of the material into and through the thickness of the material. Such processes are time consuming and detrimental to the material, if even able to cut the material at all, potentially causing fires and material macrostructure changes and variations which would compromise the material due to the length of time the high energy laser beam is in contact with the material.

In the present invention, contrary to the manufactures directions and conventional laser cutting techniques, the focal point spacer is not used and the support bench 18 is adjusted to a distance to initially position the beam focusing assembly 12 at a distance closer to the opposite bottom side 23 of the foam material 10, rather than the side closest to the mirror 13. This could therefore position the focal point F near, or even at the back side of the material to be cut. This is due to the fact that the beam will cut the foam material along the focal length $f_d$ of the beam as well as at the focal point F, and it is critical to understand that there is also residual beam energy which extends past the focal point F so that any remaining material past the focal point may also similarly be cut to some extent and the entire foam material is cut through from the top side 21 to the bottom side 23 without having to adjust the focal point F of the beam relative to the material.

Figure 4:
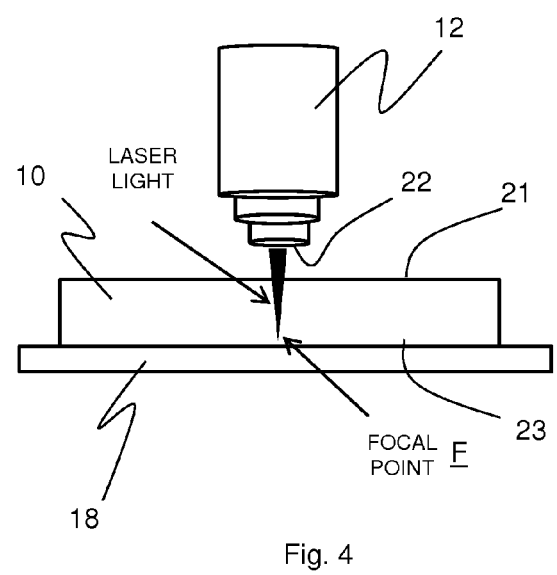
FIG. 4 is a perspective view of the adjusted laser position with the focal point within the depth or thickness of the foam material.

An important aspect of the present invention is determining the point, or depth in the material at which to provide the focal point F based on the speed and power of the laser beam. As noted above in many thicknesses of polyurethane foam material 10 as contemplated by the present invention, the focal point is initially positioned at a point deep inside the material, closer to the bottom side 23 of the material 10 than the top side 21. In other words the focal point F is adjusted to a position relative to the foam material that is within the thickness of the foam material 10 as shown in FIG. 4 and closer to the back side than the front side. Mirrors 13 can also be changed to adjust the beam focus point length $f_d$ as determined by the thickness of the foam material 10 as discussed in further detail below.

By way of example, for foam material 10 that is 1" in thickness a 1.5 inch mirror may be used and the support bench 18 is adjusted relative to the beam focusing assembly 12 to set the beam focal point F at a distance that is approximately 1" or less into the material 10 so that the beam, focal point F and residual energy all cut through the material without further adjustment of the focal point F or material relative thereto. In this manner, without altering the focal point F or material distance relative to the beam or laser apparatus, a complete cut is made through the foam material 10 without any further adjustment of the device. Where a foam material 10 of thickness for example 6" is to be cut, a 4.0" mirror is used with the focal point F initially provided at a depth of 4 inches into the foam. This also causes the front side 21 of the foam to be substantially flush with the front of the laser lens or mirror, and the residual energy of the laser beam is sufficient to cut the remaining 2" of the 6" thick material. Currently 6" is the maximum thickness of foam material 10 used in this embodiment of the invention, but given the range of mirrors that are available and the options of different thickness in foam material of greater thicknesses could be used.

It is another important aspect of the present invention that the foam workpiece material 10 is a polyurethane, open celled foam. Such foam is easily obtainable and relatively cost efficient for used in containers and packaging for protecting lighter weight, delicate or sensitive objects. The problem with cutting polyurethane foam with anything other than conventional cutting blades or hot wires is that the high energy and heat dissipation from a high-energy source such as a laser can ignite this combustible, organic, hydrocarbon based product. What is not cost efficient until now is the ability to cut and machine this foam in a cost effective manner so that the templates of the material cutouts can be readily changed without having to build new cutting blades. The presently described method and apparatus permits the user to use an appropriately powered laser beam at a speed which completely cuts through the material without causing the complete combustion of the polyurethane foam material 10. It is contemplated that other similar foams, such as polyethylene foam could potentially be cut in a similar manner.

Once the beam focal point F is set based upon the mirror selection and the thickness of the material, the design template is converted to x-y coordinates for the specific graphic designs or text that are to be cut out of the foam material 10 and this information is uploaded to the laser material processing system. The speed of movement of the laser control system is then adjusted. The speed adjustments are set to within a range based upon the density of the foam material 10 to the distance of the required cut based upon the design template. For indentations as opposed to cutting through the foam material 10 the speed is set to a higher level within a range of 80 to 100% of maximum speed and adjustments are made to reduce the power output of the laser to as low as 25% power or higher ranges up to 100% power depending upon the intricacies of the graphical design from the design template.

To cut completely through the foam material 10 the thickness of the material determines the speed settings with the power setting left at 100%. For foam material 10 of 1" thickness, the speed is set between 2.0% and 10.0% with more specifically a range of 2.0% to 5.0%. For foam material 10 of a thickness of 2" to 3", speed is set between 0.5% and 7.0% with more specifically a range of 0.9% to 4.0%. For foam material 10 of a thickness of 4" 5" or 6", speed is set between 0.5% and 5.0% with more specifically a range of 0.5% to 2.5%. These range of settings are based a foam material 10 of foam density of 1.8 lb/ft$^3$ and a 60 watt laser. Settings would vary depending upon the density of the foam, however with the use of a 60 watt laser, foams of 0.5 lb/ft$^3$ to 10 lb/ft$^3$ have been successfully cut and indented within the ranges as shown.

FIG. 4 and FIG. 5 show a graphical representation of the foam material 10 with cutouts of standard grid rectangular shapes 26 as shown in FIG. 4, and of custom designed compartments 28 as shown in FIG. 5 based upon the outline drawing of objects that require unique shapes in order to adequately protect extended or fragile components of the object. Each figure also shows the item TEXT 24 that can be created in the foam as an indentation to identify the items or manufacturer of the objects within the protective foam container. A number of different graphical formats such as .jpg, .GIF, .TIFF, .pdf, and others can be imported and converted to x-y coordinates to create the graphical designs on a number of high density foam materials in these embodiments. The graphical designs can range in sizes from 1"×1" to 80"×80".

Figure 7:
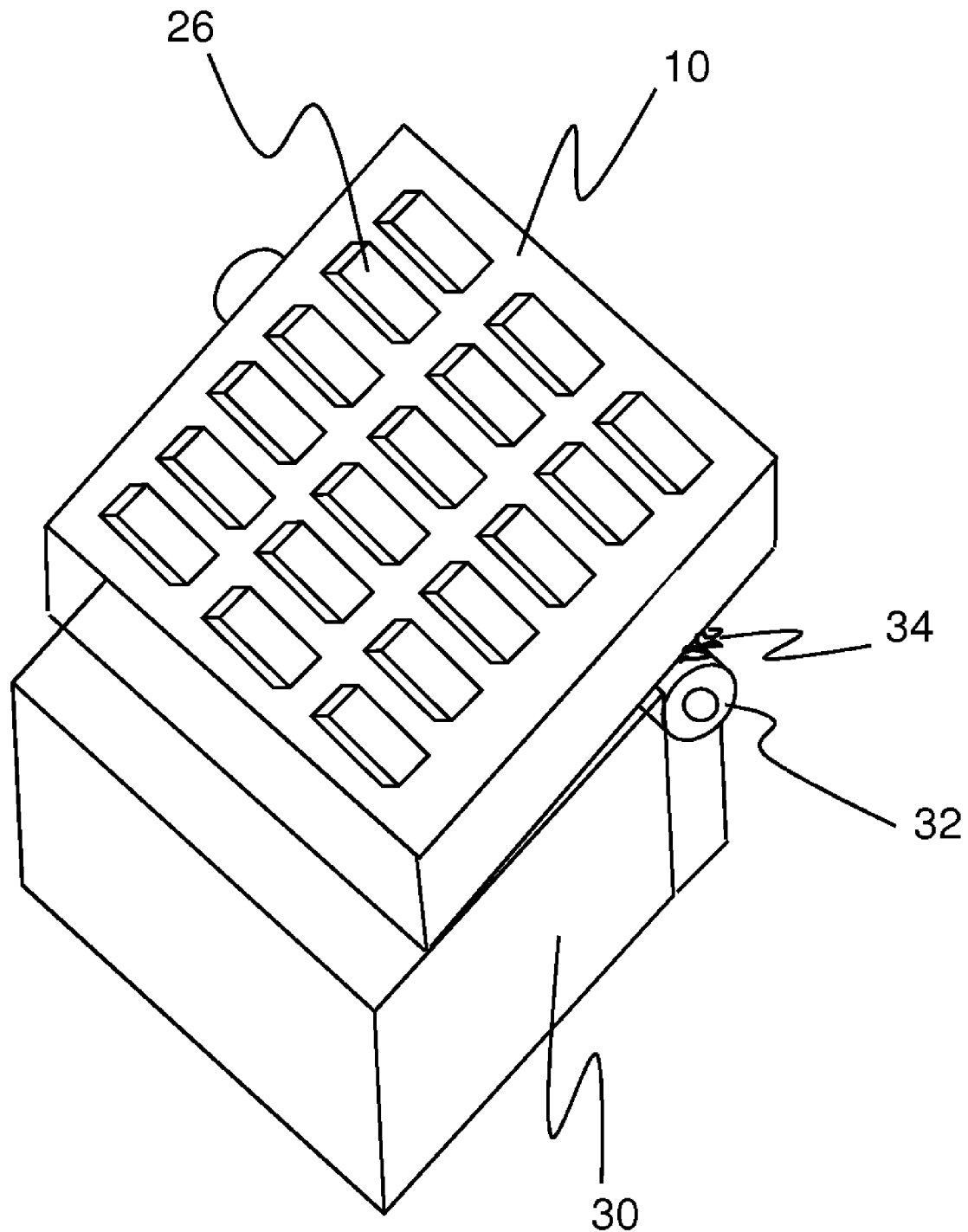
FIG. 7 is a perspective view of applying adhesive to a section of foam.
Figure 8:
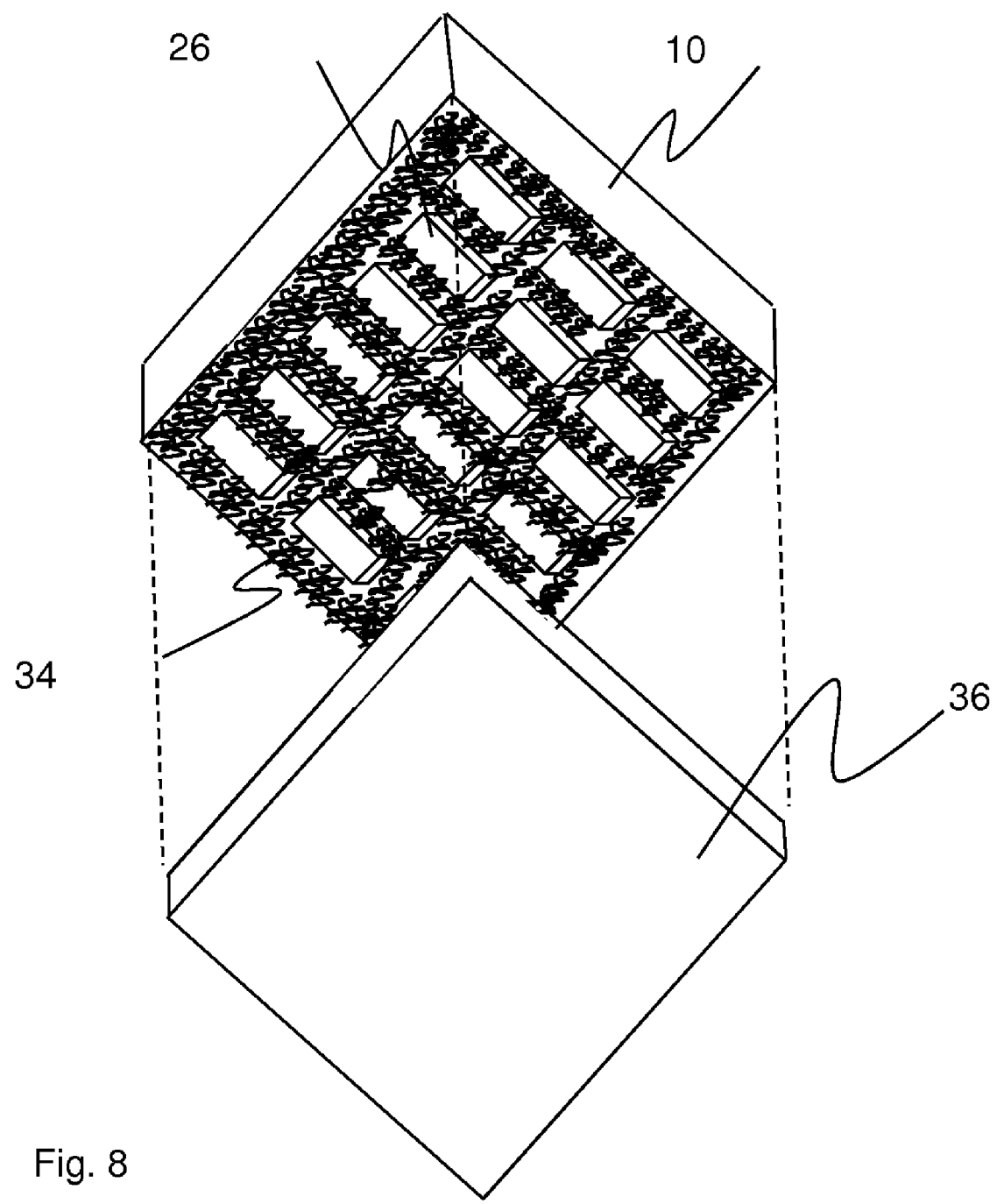
FIG. 8 is a perspective view of a section of foam surface coated throughout with an adhesive and attaching the foam surface to a support backing.

For design templates that cut through the foam material 10 a support backing 36 is adhered to the foam material 10 using a hot glue machine 30. The hot glue machine melts packets of adhesive and uses a motor to draw the adhesive 34 over the surface of a roller 32. The adhesive 34 can be evenly spread over all surfaces of the foam material 10 by dragging the material along the roller 32 as shown in FIG. 7. The foam material 10 is then placed on a support backing 36 as shown in FIG. 8. The foam density of the support backing is selected depending upon the weight of the object. Evenly coating all surfaces of the foam material 10 provides structural support to heavier objects and greater protection.

The present invention also relates to a novel method and apparatus for providing a custom foam cutting service and a final custom formed protective foam packaging to customers without having to fabricate unique cutting knives or tools to cut desired custom profiles or outlines provided by the customer. Intricate and delicate devices such as scientific apparatus and measurement devices, medical devices, models, figures or pieces used for example in war gaming, really any item which could relatively easily break or need to be recalibrated or reconfigured can require a protective travel container. Such travel containers are usually filled with foam of one kind or another to protect the desired items during transportation. The foam which is usually used as described above is a high density foam work piece material 10, usually of polyurethane, open celled foam which is dense enough to secure an item in a cushioning environment so that small or delicate parts of the item will not be broken or damaged in the event of impact to the travel container.

Figure 9:
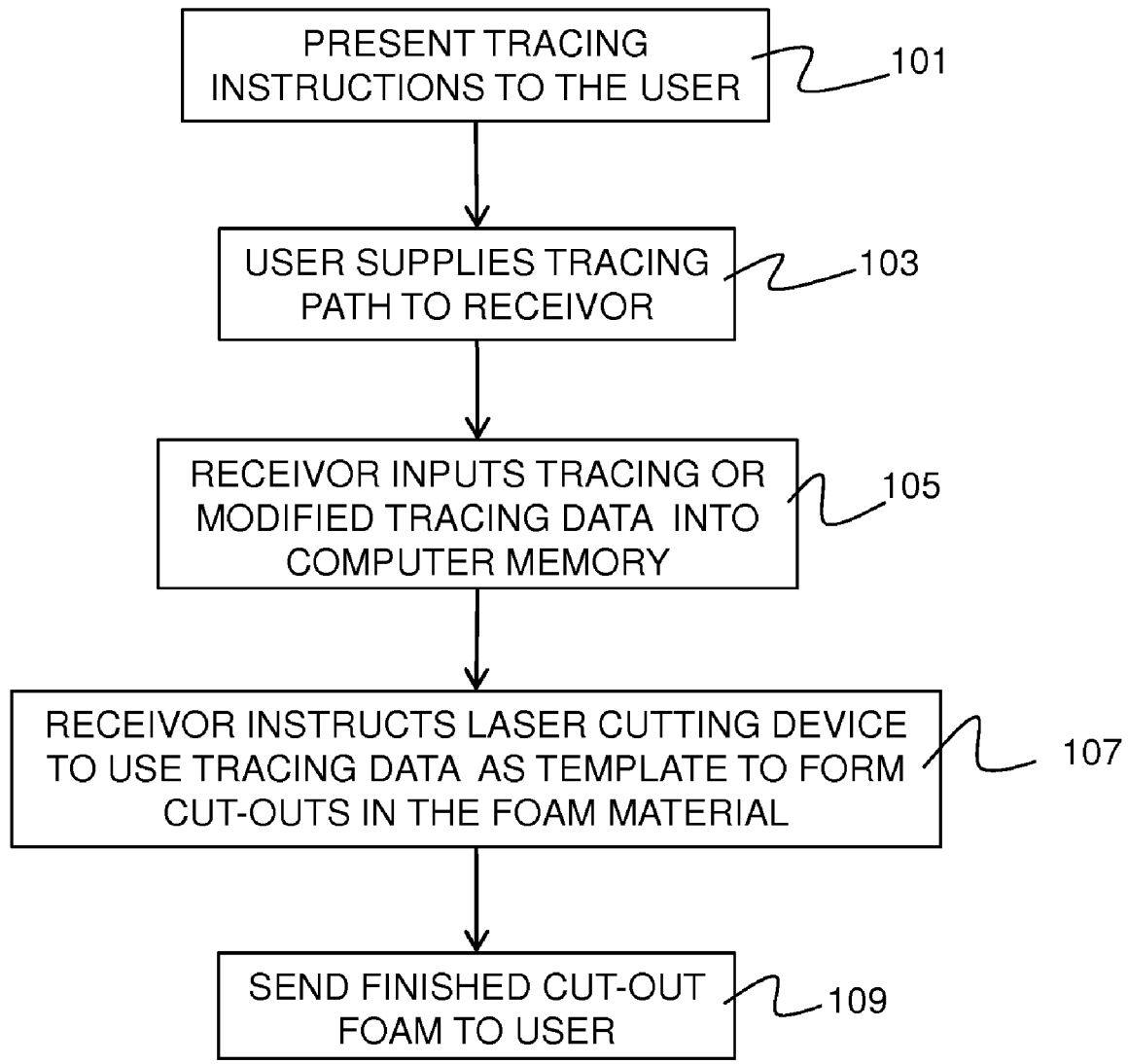
FIG. 9 is a general flow diagram of the method of the present invention.

Any small item may have its own unique shape and parts and therefore what is generally desired is a corresponding uniquely shaped cut-out in the foam to accommodate the item. The cut-outs must be precisely formed so as to secure the item as a whole, but also the cut-out must account for the outermost edges, appendages and profile of the item some of which may be delicate wires, armatures, antenna, etc. A variety of differently shaped cut-outs in a single piece of foam are often necessary to secure numerous differently shaped items such as individual models used in war gaming for example. The models of soldiers and war machines used in war gaming are expensive, delicate and have numerous appendages which must be protected. There is no single shape which can accommodate all the differences in between the different models and therefore the owners of such models demand that each model have its own unique cut-out to best protect the model. By way of general explanation and in view of the diagrammatic flow chart of FIG. 9, the method and apparatus of the present invention presents instructions at step 101 to a user which directs the user to trace the object that is to be secured within a foam cutout, the tracing is sent to the manufacturer or receiver at step 103 who inputs the trace, or a modified version of the trace, into a computer memory at step 105 and then the computer memory is accessed by the controller of a laser cutting device to direct the laser cutting device at step 107 to cut the foam to the dimensions and depths indicated by the trace and other inputs to the cutting device. The foam material now cut to the user's specifications is then sent to the user at step 109.

Figure 10:
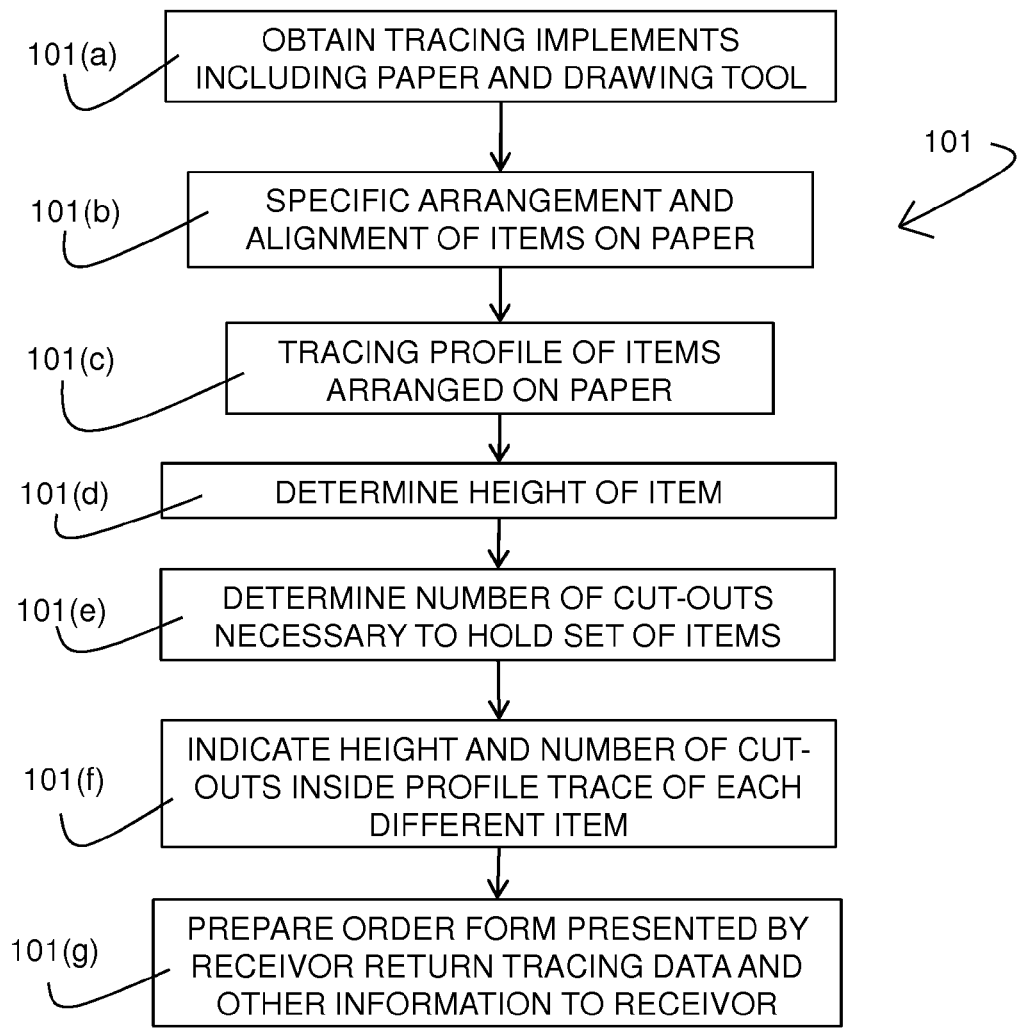
FIG. 10 is a preferred embodiment employed in the disclosed method of forming a foam protective material.

In a preferred embodiment of the method shown in FIG. 10 of the present invention the manufacturer, or a third party entity hereinafter referred to as the receiver, publishes or presents at step 101 on a website over the internet, or sends via email over the internet the set of instructions to the user who desires to acquire a foam protective apparatus for a uniquely shaped article. The instructions may be in the form of an instructional video, written directions, pictures or a combination of all of these. In general the instructions presented to the user at step 101 include at least the steps of 101(a) obtaining appropriate tracing implements including suitable paper and a drawing tool such as an ink marker; 101(b) arrangement of the items or models on the paper, for example in an upright or laying down profile; 101(c) tracing the arrangement of one or more items or models on to the paper; 101(d) determining the height of the items relative to the upright or laying down profile; 101(e) determining the number of cut-outs necessary to hold any particular set of items; 101(f) indicating the height and number of such similar items within the tracing profile on the paper; 101(g) preparing an order form with other item and order information for example name, phone, address, billing, credit card and shipping information including any special instructions or comments etc., and fax, scan, email, mail or otherwise forward the prepared tracings to a given receiving device for example, a facsimile machine, email address, website address, mail box, etc. so that the receiver receives the requested tracing and item information at step 103.

Figure 11:
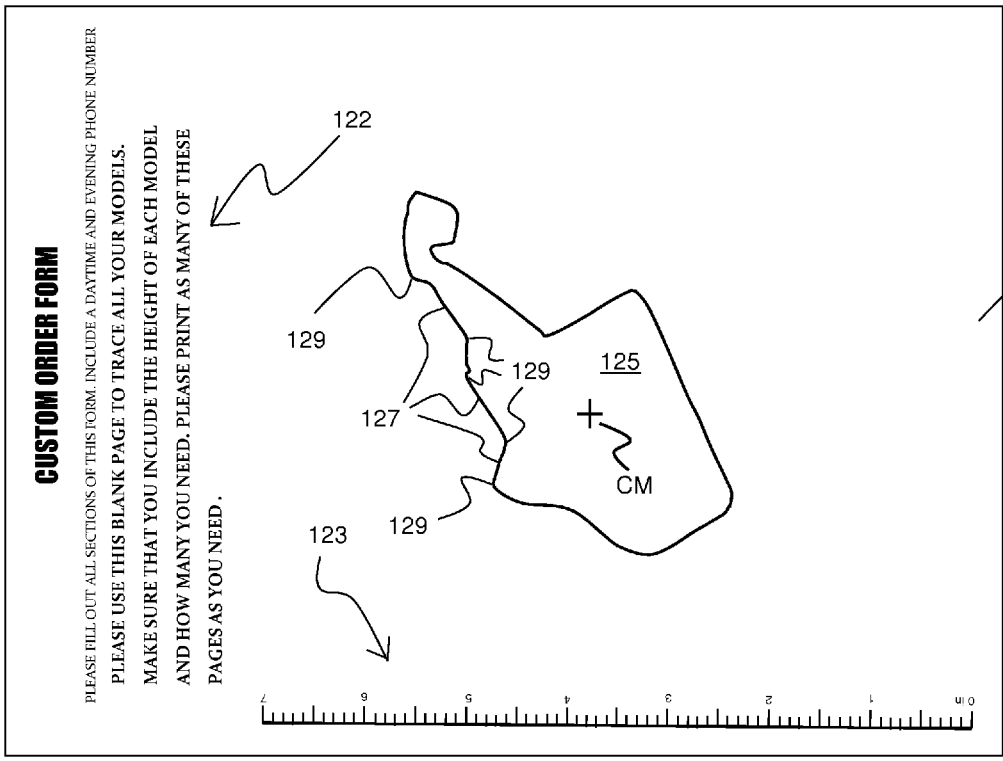
FIG. 11 is a representative tracing and profile of an item to be protected in the foam material.

Turning to FIG. 11 the tracing(s) of any item(s) may be drawn on a plain sheet of white paper or may be drawn on a specially prepared custom order page 121 as shown which includes instructions 122 and a relative scale of measurement units 123 to aid the user and receiver in determining the specific dimensions of the item and/or its tracing. The tracing 125 defines a multi-faceted geometric shape, and generally a non-symmetrical shape, which has a center of mass CM, i.e. a point where the shape has a greatest concentration of area. The tracing 125 is essentially a detailed outlined profile of the item and has a plurality of sides 127 which may be curved, linear, etc. The sides 127 are separated by intersections defining corners 129. The corners 129 may be sharp or curved intersections but in any event generally delineate one side 127 from another of the tracing 125.

Figure 12A:
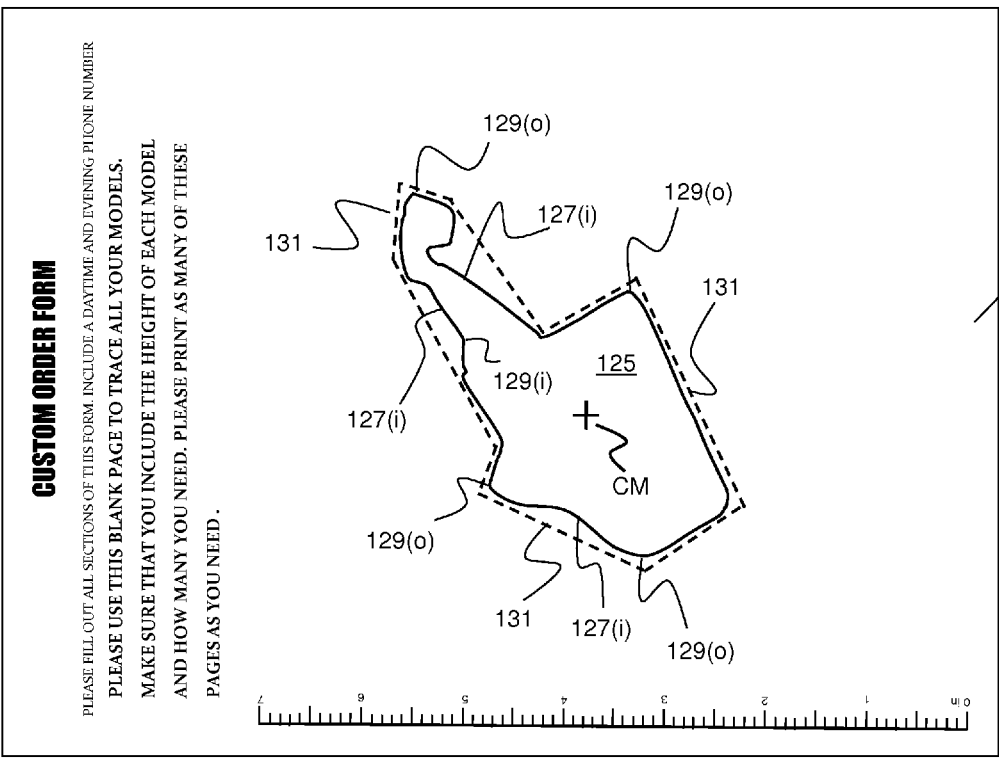
FIG. 12($a$) is a tracing and profile showing best fit lines relative to the initial tracing.

Upon receipt of the tracing 125 and related information described above the receiver modifies the tracing(s) 125 into a simpler geometric shape keeping in mind the outermost profile corners 129(o), i.e. essentially those corners 129(o) that are farthest from the center of mass CM of the tracing. The outermost profile corners 129(o) must of course be maintained in order to ensure there is sufficient room to fit the extremities of the model and its appendages into the final cut-out in the foam. In other words, tracings 125 may include intricate appendages which can be simplified by a best fit line 131, or series of best fit lines between non-adjacent outermost corners 129(o) of the tracing. As seen in FIG. 12(a) these best fit lines 131 shown here eliminate intermediate corners 129(i) which are between adjacent outermost corners 129(o) and relatively closer to the center of mass CM. This simplifies the more complex geometric shape provided by the initial tracing 125 so that a simpler geometric shape is provided and thus easier to cut while still maintaining a snug fit for the model or item to be secured in the foam cut-out. As can be appreciated, this also eliminates the plurality of intermediate 127(i) sides between these adjacent outer most corners 129(o) or inner most corners 129(i) again making the profile and geometric shape simpler to cut while still accommodating the item and any intricate or appendage elements.

Figure 12B:
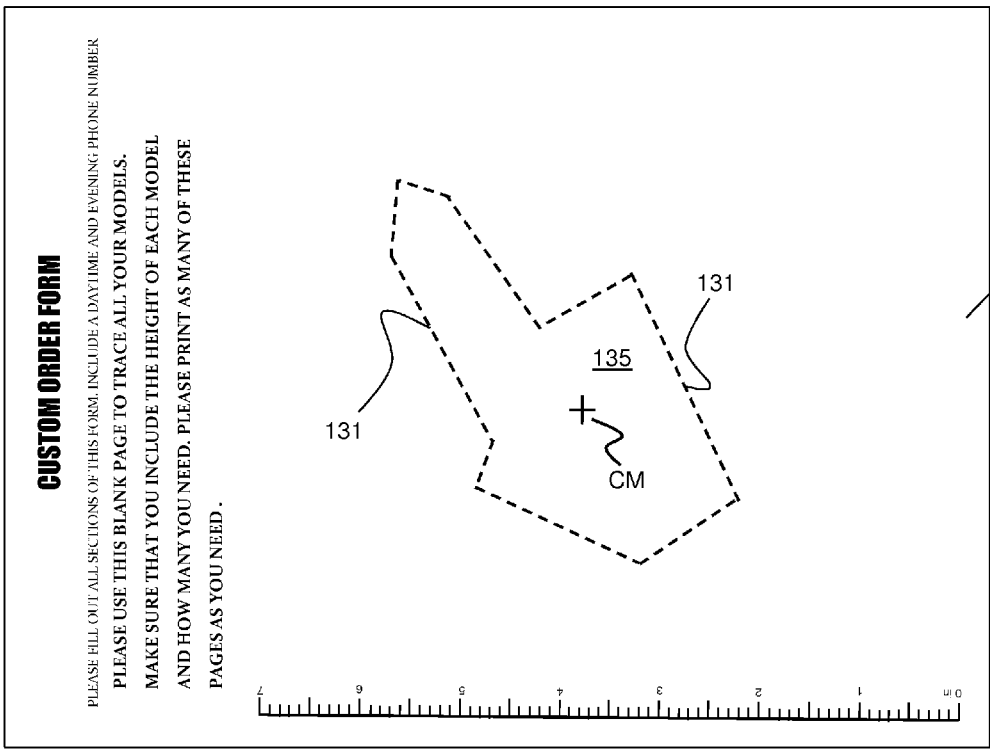
Figure 13:
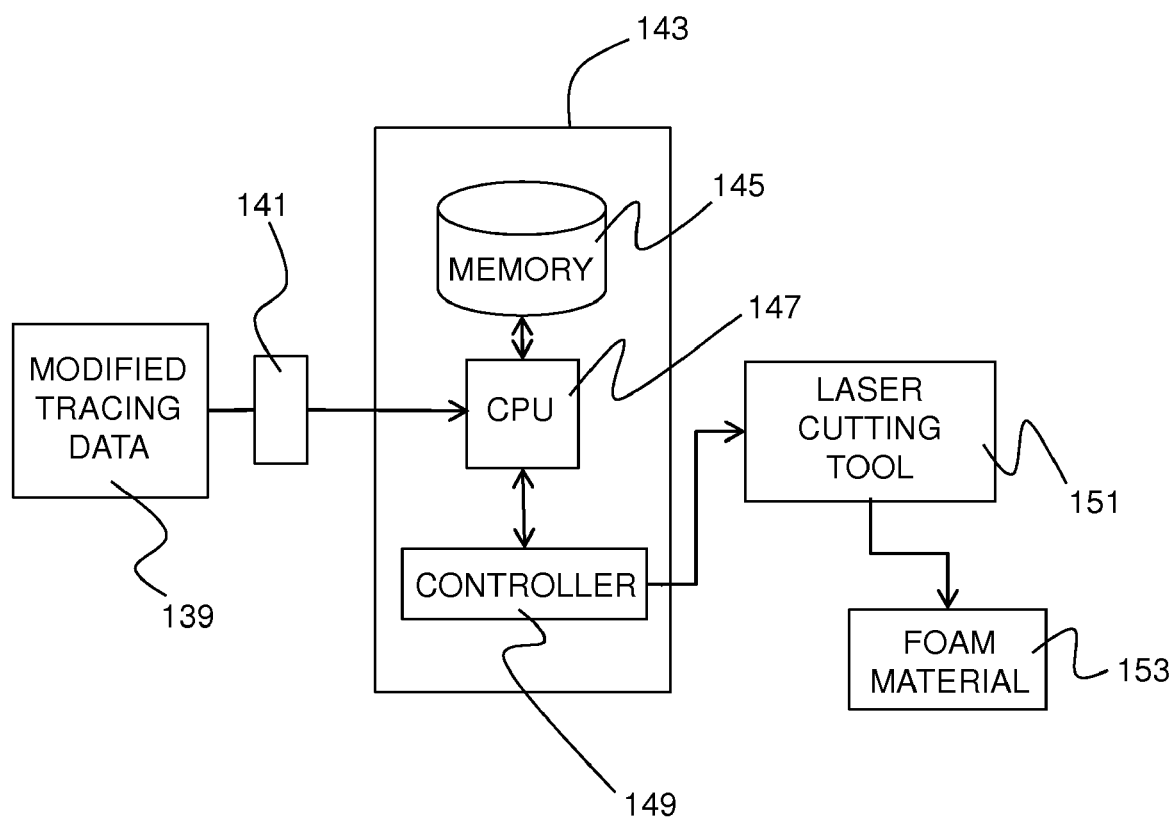
FIG. 13 is a diagrammatic representation of a computer system for controlling the foam cutting tool according to the disclosed method of the present invention.

With the final simplified profile complete a modified tracing 135 having sides of best fit lines 131 is determined as shown in FIG. 12(b) and extraneous intermediate sides 127(i) and corners 129(i) eliminated and/or reduced, the modified tracing 135 is converted to computer readable data 139 by scanning or other input means 141 for a computer 143 to a memory 145 accessible by a computer processor 147. The receiver can arrange via a requisite computer drawing or graphics program in the CPU 147 any desired number of final profiles on a template on the computer and can accommodate these to fit in any particular size of foam material. The final profile data included on a template in the graphics program can then be saved and accessed by the processor 147 and the requisite cut-out and template data via an electronic controller 149 is transmitted to the laser cutting tool 151. The laser cutting tool 151 cuts the cut-outs into the desired foam material 153 in accordance with the supplied data and instructions. In addition to the computer controlled formation of the cut-outs in the foam material, a choice of thickness of foam must be made by the user based on the specified height of the item for each tracing. This height information enables a volume determination to be made by the receiver so that a proper thickness of foam material may be chosen to accommodate the height of the item and the depth to which the laser cutting tool is arranged and/or instructed to cut.

With the proper thickness of foam selected and the laser cutting device or controller programmed with the data for the final tracing(s) 139 and template for any given piece of foam material the laser cutting device 151 is arranged in the manner as discussed in detail above with the appropriate mirror size and the appropriate adjustment of the support bench 18 for supporting the foam material to modify the beam focusing assembly 12 and set the beam focal point F at a distance that is approximately at an intermediate point that is less than the thickness of the foam material 10 so that the beam, focal point F and residual energy all cut through the material without further adjustment of the focal point F or material relative thereto. In this manner, without altering the focal point F or material distance relative to the beam or laser apparatus, a complete cut is made through the foam material 10 in the shape of the programmed modified tracing(s) 135 without any further adjustment of the device.

The invention has been described in detail with particular reference to certain preferred embodiments thereof, but it will be understood that variations and modifications can be effected within the spirit and scope of the invention.

I claim:

1. A method of cutting a protective polyurethane foam material to match a predetermined design template with a laser, the method comprising the steps of:
   inputting the predetermined design template into a computer memory connected with a laser controller;
   selecting a desired thickness and density of protective polyurethane foam material as defined between a front surface and rear surface of the foam material into which the predetermined design template is to be cut with the laser;
   selecting a mirror power based on the thickness of the foam for the laser which defines a focal point of the laser at a desired distance from the laser along a beam axis;
   supporting the selected foam material adjacent an output of the laser;
   arranging the protective foam material adjacent the output of the laser and along the beam axis and aligning the focal point of the laser at an intermediate point between the front surface and the rear surface, and closer to the rear surface of the foam material than the front surface of the foam material, based on the mirror power selected and the thickness of the selected foam material;

inputting a speed setting to the laser controller based upon at least one of the density and thickness of the foam material;

energizing the laser to cut the predetermined design template into the protective foam at a speed setting determined as a function of at least one of the density and thickness of the foam material; and arranging the focal point of the laser at the intermediate point between the front surface and the rear surface of the foam material where residual laser energy beyond the focal point of the beam completes cutting through the foam material.

2. The method as set forth in claim 1 further comprising the step of providing a planar support for the foam material that is adjustable relative to the cutting device along an axis parallel with the beam axis.

3. The method as set forth in claim 2 further comprising the step of adjusting the planar support along the beam axis so that the laser cuts entirely through the foam material.

4. The method as set forth in claim 2 further comprising the step of adjusting the planar support along the beam axis so that the laser cuts partially through the foam material.

5. The method as set forth in claim 4 further comprising the step of adjusting the speed of the laser in accordance with at least one of the density of the foam and the desired depth of the material to be cut.

6. The method as set forth in claim 1 further comprising the step of completely cutting through the entire thickness of the foam material in a single pass of the laser across the foam material.

7. The method as set forth in claim 6 further comprising the step of completely cutting through the foam material without any change or adjustment of the foam material relative to the output of the laser along the beam axis.

8. A method of cutting a protective polyurethane foam material with a laser to match a predetermined tracing of an item, the method comprising the steps of:

tracing an outline of the item to be protected on a sheet of paper;

reducing the complexity of the tracing by replacing a plurality of sides of the tracing with a single linear best fit line to form a geometric shape;

extending the best fit line between two non-adjacent corners of the tracing to replace at least two intersecting sides of the geometric shape;

maintaining any outermost corners of the geometric shape in the tracing;

inputting the predetermined tracing into a computer memory connected with a laser controller;

selecting a desired thickness and density of protective polyurethane foam material as defined between a front surface and rear surface of the foam material into which the predetermined design template is to be cut with the laser;

selecting a mirror power relative to the thickness of the foam material for the laser which defines a focal point of the laser at a desired distance from the laser along a beam axis; and arranging the focal point of the laser at an intermediate point between the front surface and the rear surface, and closer to the rear surface of the foam material than the front surface of the foam material where residual laser energy beyond the focal point of the beam completes cutting through the foam material;

inputting a speed setting to a laser controller based upon at least one of the density and thickness of the foam material; and energizing the laser to cut the predetermined design template into the protective foam material foam at the input speed setting determined as a function of at least one of the density and thickness of the foam which cuts the protective foam material without causing complete combustion of the foam material.

* * * * *